United States Patent
Tang et al.

(10) Patent No.: US 9,766,687 B2
(45) Date of Patent: Sep. 19, 2017

(54) CAPACITIVE STYLUS WITH POWER SAVING APPARATUS

(71) Applicant: WALTOP INTERNATIONAL CORPORATION, Hsinchu (TW)

(72) Inventors: Ying Hwa Tang, Hsinchu (TW); A-Li Wong, Hsinchu (TW)

(73) Assignee: WALTOP INTERNATIONAL CORPORATION, Hsinchu (TW)

( * ) Notice: Subject to any disclaimer, the term of this patent is extended or adjusted under 35 U.S.C. 154(b) by 0 days.

(21) Appl. No.: 14/969,016

(22) Filed: Dec. 15, 2015

(65) Prior Publication Data

US 2017/0123474 A1    May 4, 2017

(30) Foreign Application Priority Data

Oct. 28, 2015 (TW) .............................. 104135346 A

(51) Int. Cl.
| | |
|---|---|
| G06F 1/32 | (2006.01) |
| G06F 3/038 | (2013.01) |
| G06F 3/0354 | (2013.01) |
| G06F 3/044 | (2006.01) |

(52) U.S. Cl.
CPC ............ *G06F 1/325* (2013.01); *G06F 3/0383* (2013.01); *G06F 3/03545* (2013.01); *G06F 3/044* (2013.01); *G06F 2203/04106* (2013.01)

(58) Field of Classification Search
CPC .... G06F 1/325; G06F 3/03545; G06F 3/0383; G06F 3/044; G06F 2203/04106
USPC ........................................ 345/179; 178/18.06
See application file for complete search history.

(56) References Cited

U.S. PATENT DOCUMENTS

| | | | | |
|---|---|---|---|---|
| 6,009,496 A * | 12/1999 | Tsai | ...................... | G11C 16/102 365/185.09 |
| 2008/0029316 A1* | 2/2008 | Jaeger | ..................... | G06F 3/042 178/19.01 |
| 2009/0065268 A1* | 3/2009 | Katsurahira | ............ | G06F 3/046 178/19.01 |

* cited by examiner

*Primary Examiner* — Stephen Sherman
(74) *Attorney, Agent, or Firm* — Huffman Law Group, PC

(57) ABSTRACT

A capacitive stylus with a power saving apparatus is disclosed. The capacitive stylus uses a controller to output signals to control a power circuit to regulate or convert a voltage from a power source to different working voltages for the controller so as to save electrical power of the capacitive stylus.

6 Claims, 2 Drawing Sheets

CAPACITIVE STYLUS WITH POWER SAVING APPARATUS

CROSS-REFERENCE TO RELATED APPLICATIONS

The entire contents of Taiwan Patent Application No. 104135346, filed on Oct. 28, 2015, from which this application claims priority, are expressly incorporated herein by reference.

FIELD OF THE INVENTION

The present invention relates to a capacitive stylus, and more particularly to a capacitive stylus with a power saving apparatus.

DESCRIPTION OF THE PRIOR ART

Capacitive touch input technology which is widely used in the touch panel not only allows user to proceed input operation via user's hand, but also provide user with a more exquisite writing input operation by using a handheld capacitive stylus to present various functions including stroke thickness changes. A touch panel detects coordinates of a capacitive stylus via capacitive coupling established between detection electrodes of the touch panel and the capacitive stylus when the capacitive stylus approaches the touch panel. In order to establish capacitive coupling between detection electrodes and a capacitive stylus, the capacitive stylus must output high voltage signals to the touch panel so that detection electrodes of the touch panel can detect the capacitive stylus. In order to maintain operation, a capacitive stylus must continue receiving driving signals from detection electrodes and outputting signals. A microcontroller of a capacitive stylus processes received signals and outputs processed signals to other components. A microcontroller of a capacitive stylus may not be operated at a single voltage. Some operations need higher voltages and speeds, while other operations can be performed at lower voltages and speeds. Thus continuing to operate at high voltages and speeds for a microcontroller is unnecessary and will consume more electrical energy. Thus the invention provides a capacitive stylus with a power saving apparatus which provides different voltages according to requirements to save unnecessary electrical power consumption and to achieve objective of power saving.

SUMMARY OF THE INVENTION

An object of the present invention is to provide a capacitive stylus with a power saving apparatus, which can allow a controller of the capacitive stylus being operated at different voltages according to requirements to achieve objective of saving electrical power of the capacitive stylus.

According to the object, one embodiment of the present invention provides a capacitive stylus with a power saving apparatus. The capacitive stylus comprises a controller; a switch circuit and a power circuit. The controller outputs a first signal and a second signal to the switch circuit. The switch circuit controls the power circuit to regulate or convert a voltage from a power source to a first voltage or a second voltage according to the first signal or the second signal, the power circuit supplies the first voltage or the second voltage to the controller, wherein the first voltage is higher than the second voltage.

Another embodiment of the present invention provides a capacitive stylus with a power saving apparatus comprising a controller and a power circuit. The controller outputs a plurality of signals to the power circuit, each of the signals comprises a first signal or a second signal, the power circuit regulates or converts a voltage from a power source to a first voltage or a second voltage according to the first signal or the second signal, the power circuit supplies the first voltage or the second voltage to the controller, wherein the first voltage is higher than the second voltage.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the scale of each component may not be expressly exactly.

In embodiments of the invention, some features related to a capacitive stylus, which are not essential to the invention and are well known for any person skilled in the art to make and use the same, will not be described in detail herein. For example, the following features relating to a capacitive stylus and a touch panel are well known for any person skilled in the art to make and use the same. A capacitive stylus includes a conductive nib, a pressure sensor, a control circuit, and etc., while a touch panel has a capacitive detection array with a plurality of detection electrodes, wherein the detection electrodes comprise transmitting electrodes (Tx) and receiving electrodes (Rx). When a capacitive stylus is used upon a touch panel, the conductive nib approaches or contacts the capacitive detection array of the touch panel, and the conductive nib of the capacitive stylus will establish capacitive coupling with the detection electrodes under or adjacent the capacitive stylus which provide the capacitive stylus with driving signals. The capacitive stylus outputs a signal to the detection electrodes under or adjacent the capacitive stylus after receiving and processing the driving signals. Through capacitive coupling between the conductive nib and the detection electrodes, the signal from the capacitive stylus will be detected during scanning transmitting electrodes and receiving electrodes so that coordinates of the capacitive stylus can be calculated and determined. The capacitive detection array can use charge accumulation circuit, a capacitance modulation circuit, or other capacitance sensing methods known by those skilled in the art.

Figure 1A:
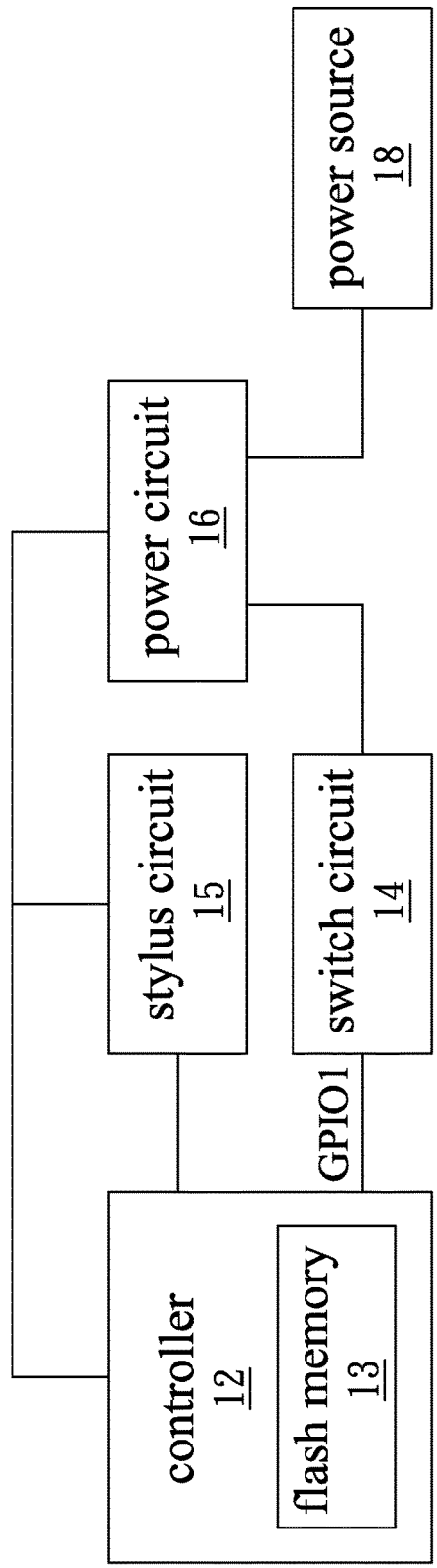
FIG. 1A is a schematic block diagram of a capacitive stylus with a power saving apparatus according to one embodiment of the invention.

FIG. 1A is a schematic block diagram of a capacitive stylus with a power saving apparatus according to one embodiment of the invention. In this embodiment, the capacitive stylus comprises a controller 12, a switch circuit 14, a stylus circuit 15, a power circuit 16 and a power source 18. The controller 12 includes an embedded flash memory 13. The switch circuit 14 comprises metal oxide semiconductor devices, transistors, resistors, capacitors and any suitable devices. The stylus circuit 15 comprises amplifier circuit(s), comparator circuit(s), converters or boost circuits, and etc. The power circuit 16 comprises voltage regulators or voltage converters. The power circuit 16 regulates or converts output voltages of the power source 18 to voltages for operating the controller 12. The power source 18 comprises a battery.

The capacitive stylus with a power saving apparatus according to one embodiment of the invention utilizes general purpose input/output (GPIO) to output digital control signals to the switch circuit 14. When the controller 12 needs to operate at a higher voltage and speed, such as a higher voltage for write operation of the flash memory 13, the controller 12 outputs a voltage signal "1" to the switch circuit 14 via a general purpose input/output pin GIPO1. The switch circuit 14 drives the power circuit 16 to regulate or convert a voltage from the power source 18 to output a voltage for write operation of the flash memory 13, such as 2.5 volt. That is, the controller 12 outputs a signal to the switch circuit 14 through the pin GIPO1 to raise a supply voltage of the controller 12 so that write operations of the flash memory 13 can be successfully performed, wherein the supply voltage and speed of the controller 12 are raised temporarily. When the controller 12 no longer needs to operate at a higher voltage and speed, the controller 12 outputs a voltage signal "0" to the switch circuit 14 via the general purpose input/output pin GIPO1. The switch circuit 14 ceases driving the power circuit 16 to regulate or convert a voltage from the power source 18 to output a higher voltage to the controller 12 so that the power source 18 outputs a lower voltage to the controller 12, such as 1.8 volt. Thus the controller 12 resumes operations at a lower voltage and speed and return to a power saving status. Therefore, the capacitive stylus of the invention maintains operation of the controller at a relative lower voltage and speed, and only temporarily raises the voltage and speed when necessary so as to avoid the controller 12 being continually operated at a higher voltage and speed to save electrical power consumption.

Figure 1B:
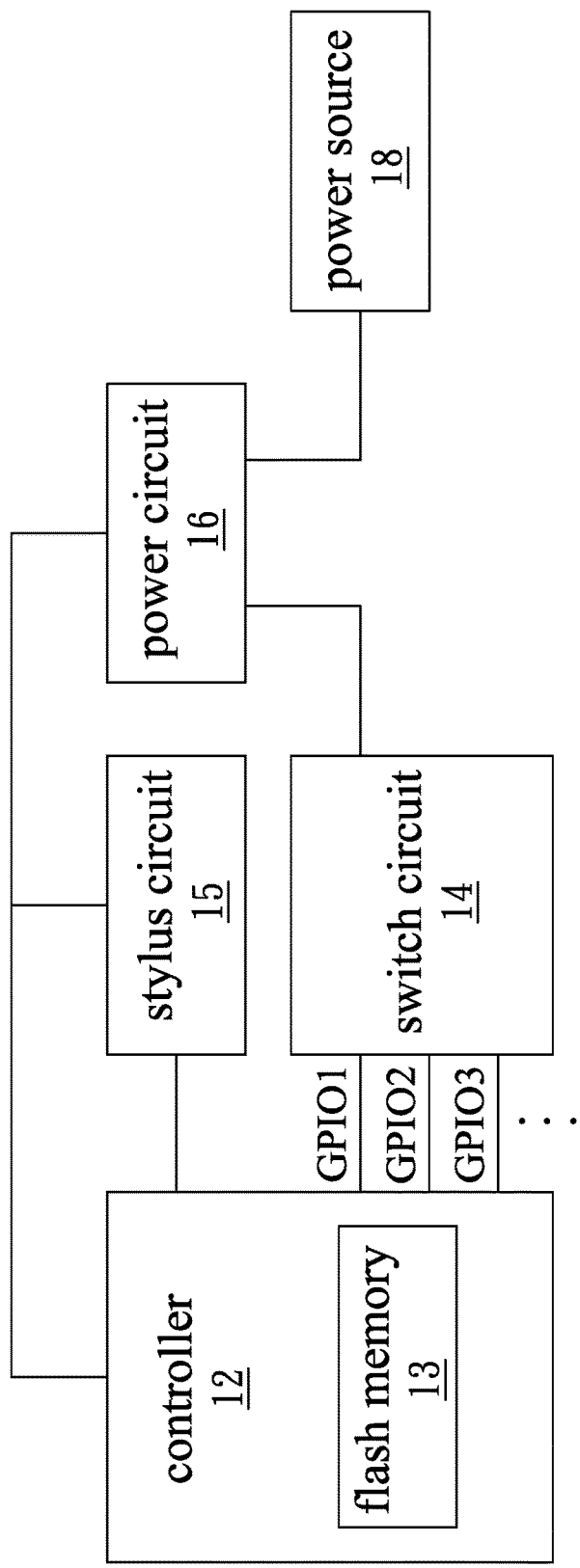
FIG. 1B is a schematic block diagram of a capacitive stylus with a power saving apparatus according to another embodiment of the invention.

FIG. 1B is a schematic block diagram of a capacitive stylus with a power saving apparatus according to another embodiment of the invention. In this embodiment, the capacitive stylus with a power saving apparatus utilizes a plurality of GPIO pins to output digital control signals to the switch circuit 14 to drive the power circuit 16 to regulate or convert a voltage from the power source 18 to a higher supply voltage for the controller 12. The GPIO pins, such as GIPO1, GIPO2, GIPO3, etc., can be used to output control signals comprising a plurality of digital signals "1" or "0", such as "1010", "111", "0101", etc., to control the power circuit 16 to regulate or convert a voltage from the power source 18 to provide the controller 12 with at least two higher voltages.

The designation of GIPO pins of the controller 12 for outputting digital control signals can be performed by encoding a register of the controller 12 with instructions so as to utilize GIPO pins to output high voltage level signals "1" or low voltage level signals "0" to the switch circuit 14. In another embodiment of the invention, the switch circuit 14 can be omitted and the controller 12 outputs digital control signals to the power circuit 16. The power circuit 16 provides the controller 12 with different voltages according to the digital control signals from the controller 12. The power circuit 16 regulates or converts a voltage from the power source 18 according to the digital control signals from the controller 12 to meet requirements of supply voltage of the controller 12. The supply voltages of the controller 12 can be designated by a program encoded in a firmware such as the flash memory 13. The controller 12 outputs digital control signals via GIPO pins to the power circuit 16. The power circuit 16 regulates or converts a voltage from the power source 18 according to the digital control signals from the controller 12 to provide the controller 12 with predesignated supply voltages. The controller 12 is continually provided with a lower supply voltage if a higher supply voltage is not necessary.

The block diagrams of the capacitive styluses with power saving apparatuses shown in FIGS. 1A and 1B according to embodiments of the invention are only examples instead of limitations, any equivalents, alternatives or modifications of the embodiment corresponding to the spirit of invention should be encompassed in the scope of the invention. Other circuit designs or components can be used depending on requirements of design.

The capacitive stylus of the invention only temporarily raises the voltage provided for the controller when a higher voltage is necessary for operating the controller. The controller will be operated at a lower voltage and the capacitive stylus will return to a power saving status when a higher voltage is not necessary for operating the controller so as to save electrical power consumption.

Although specific embodiments have been illustrated and described, it will be appreciated by those skilled in the art that various modifications may be made without departing from the scope of the present invention, which is intended to be limited solely by the appended claims.

What is claimed is:

1. A capacitive stylus with a power saving apparatus, comprising:
a controller having a flash memory and a general purpose input/output (GPIO) pin;
a switch circuit, in response to a voltage being needed for write operation of the flash memory, the controller outputting a first signal to the switch circuit; otherwise the controller outputting a second signal to the switch circuit; and
a power circuit connecting to a power source and continuously supplying a second voltage to the controller, the switch circuit driving the power circuit to regulate or convert a voltage from the power source to output a first voltage for write operation of the flash memory in response to the first signal being received; the switch circuit ceasing to drive the power circuit in response to the second signal being received so that the power circuit supplies the second voltage to the controller, wherein the first voltage is higher than the second voltage.

2. The capacitive stylus according to claim 1, wherein the first signal and the second signal are digital signals "1"and "0" respectively.

3. The capacitive stylus according to claim 1, wherein the power circuit comprises a voltage regulator or a voltage converter.

4. A capacitive stylus with a power saving apparatus, comprising:
a controller having a flash memory and a plurality of general purpose input/output (GPIO) pins, a plurality of supply voltages being designated by a program encoded in the flash memory;

a switch circuit, in response to one of the plurality of supply voltages being needed for write operation of the flash memory, the controller outputting a first signal to the switch circuit via one of the plurality of general purpose input/output (GPIO) pins wherein the first signal corresponds to the one of the plurality of supply voltages; otherwise the controller outputting a second signal to the switch circuit; and a power circuit connecting to a power source and continuously supplying a second voltage to the controller, the switch circuit driving the power circuit to regulate or convert a voltage from the power source to output a first voltage for write operation of the flash memory in response to the first signal being received, wherein the first voltage corresponds to the one of the plurality of supply voltages; the switch circuit ceasing to drive the power circuit in response to the second signal being received so that the power circuit supplies the second voltage to the controller, wherein the first voltage is higher than the second voltage.

5. The capacitive stylus according to claim 4, wherein the first signal and the second signal are digital signals "1"and "0" respectively.

6. The capacitive stylus according to claim 4, wherein the power circuit comprises a voltage regulator or a voltage converter.

* * * * *